United States Patent
Ficyk et al.

[11] Patent Number: 6,026,705
[45] Date of Patent: Feb. 22, 2000

[54] CABLE ASSEMBLY FOR REAR SEAT RELEASE LOCK-OUT SYSTEM

[75] Inventors: Eugene J. Ficyk, Dearborn; David A. Van Zanten, Troy; Michael Konn, Utica, all of Mich.

[73] Assignee: Nagle Industries, Inc., Clawson, Mich.

[21] Appl. No.: 09/081,435

[22] Filed: May 19, 1998

[51] Int. Cl.[7] .................................................. G05G 5/28
[52] U.S. Cl. ...................... 74/500.5; 74/479.01; 74/527; 292/195; 292/216; 292/DIG. 42; 292/DIG. 43
[58] Field of Search ............................. 74/500.5, 479.01, 74/527; 292/201, 216, DIG. 23, DIG. 42, DIG. 43, 195

[56] References Cited

U.S. PATENT DOCUMENTS

| | | |
|---|---|---|
| 4,009,678 | 3/1977 | North . |
| 4,457,035 | 7/1984 | Habegger et al. . |
| 4,544,189 | 10/1985 | Fiordellisi et al. ............... 292/DIG. 43 |
| 4,569,431 | 2/1986 | Roeker . |
| 4,691,584 | 9/1987 | Takaishi et al. ........................ 74/500.5 |
| 4,836,591 | 6/1989 | Faust ...................................... 292/201 |
| 4,898,046 | 2/1990 | Mancewicz et al. . |
| 5,236,233 | 8/1993 | Fukumoto et al. .................... 74/500.5 |
| 5,263,309 | 11/1993 | Campbell et al. . |
| 5,613,733 | 3/1997 | Miller, Sr. et al. . |
| 5,662,369 | 9/1997 | Tsuge . |
| 5,909,918 | 6/1999 | Kowalewski et al. .................. 292/201 |

*Primary Examiner*—Tamara L. Graysay
*Assistant Examiner*—William C Joyce
*Attorney, Agent, or Firm*—Dinnin & Dunn PC

[57] ABSTRACT

A cable assembly secured inside the trunk compartment of a motor vehicle having dual actuator cables. The cable assembly includes a housing, a pulley member rotatably mounted to the housing and a slide lock member. A first actuator cable slidingly cooperates through the housing and pulley member with one end attached to a pull-strap inside the trunk compartment and the second end attached to a release latch. A second actuator cable has one end attached to a pull-strap located in the proximity of the driver's seat and the second end attached to the pulley member to rotate the pulley member upon pulling the pull-strap. Rotating the pulley member allows the pulley member to engage a ball slug on the first actuator cable to drive the second end and actuate the release latch. A slide lock member is capable of engaging the pulley member to prevent rotation, and therefore, prevent the pull strap in the passenger compartment from actuating the release latch.

16 Claims, 3 Drawing Sheets

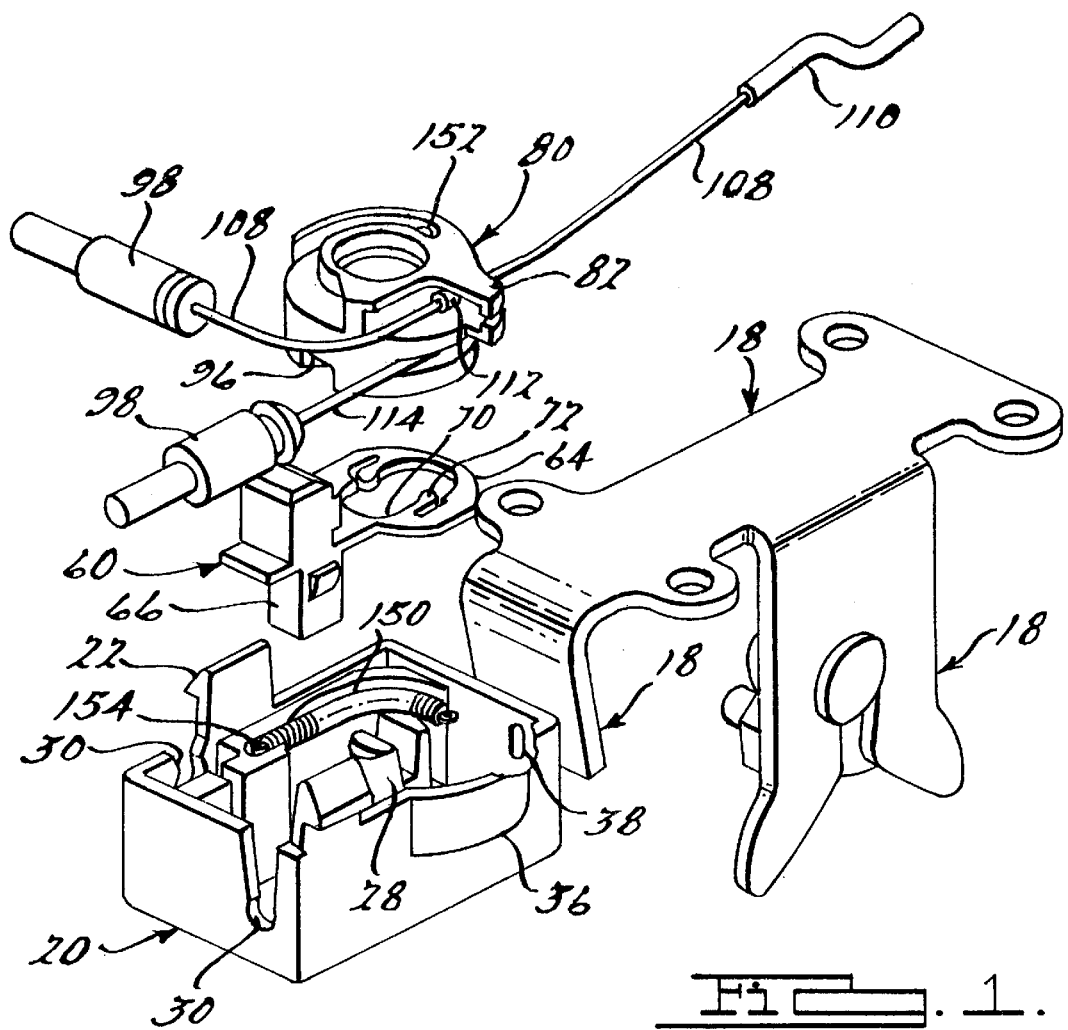
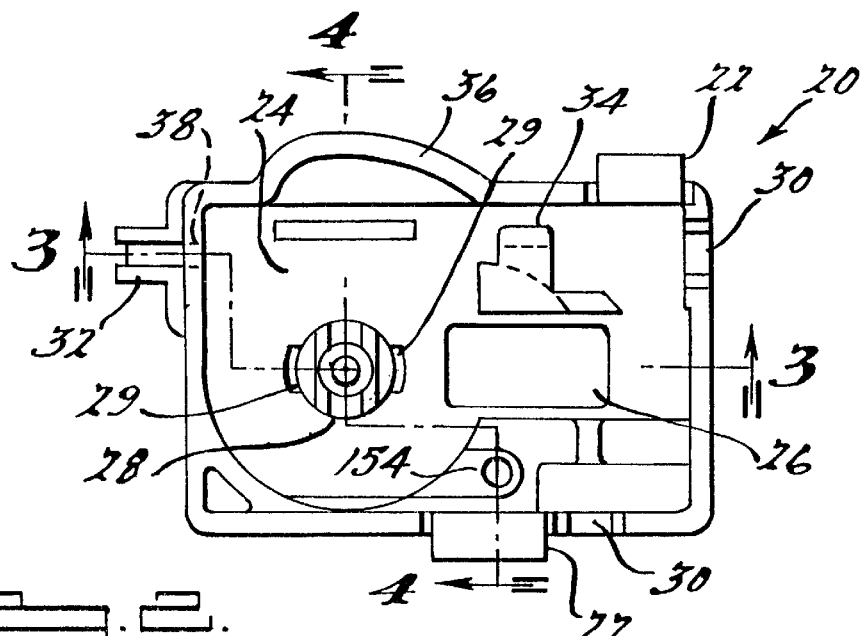

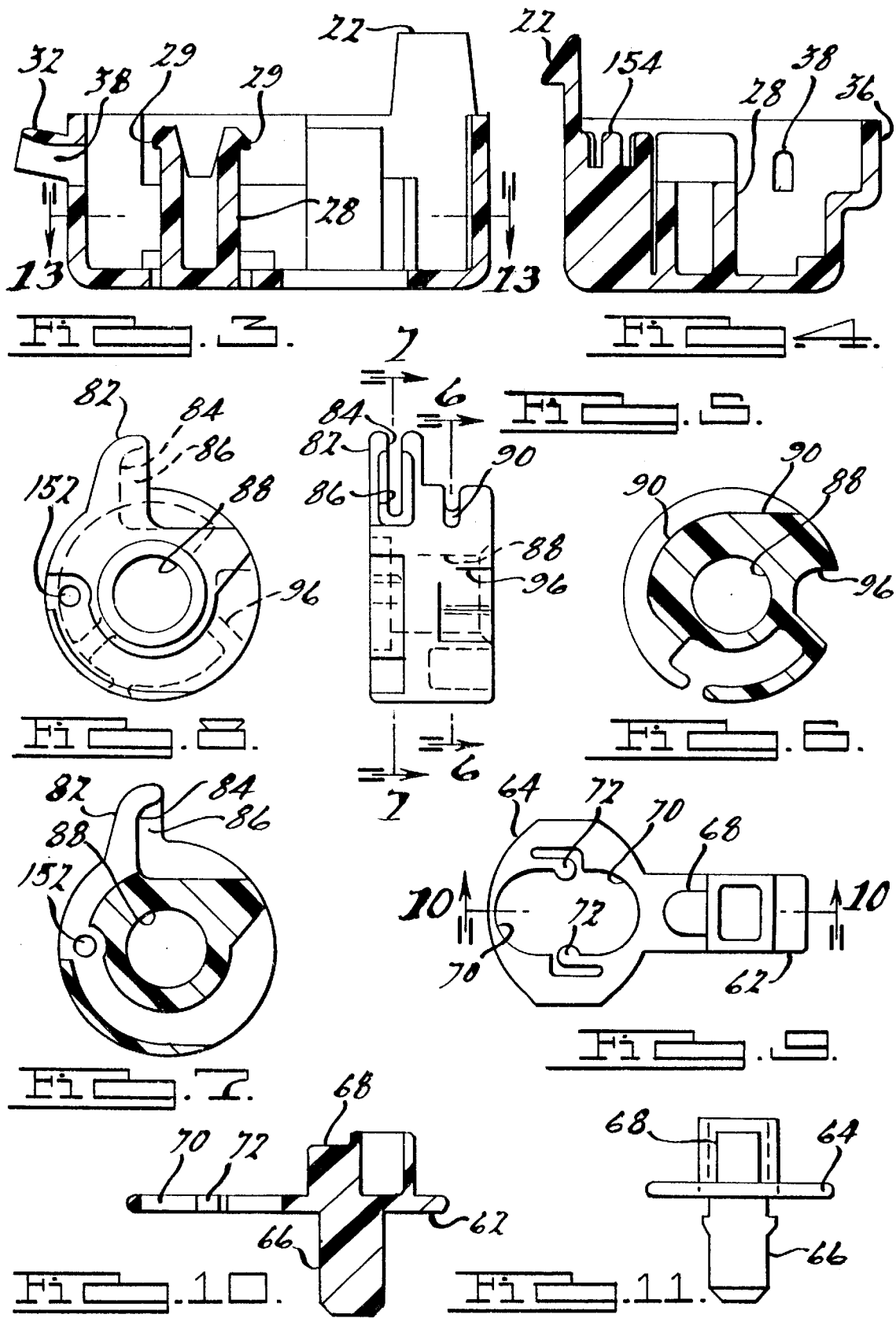

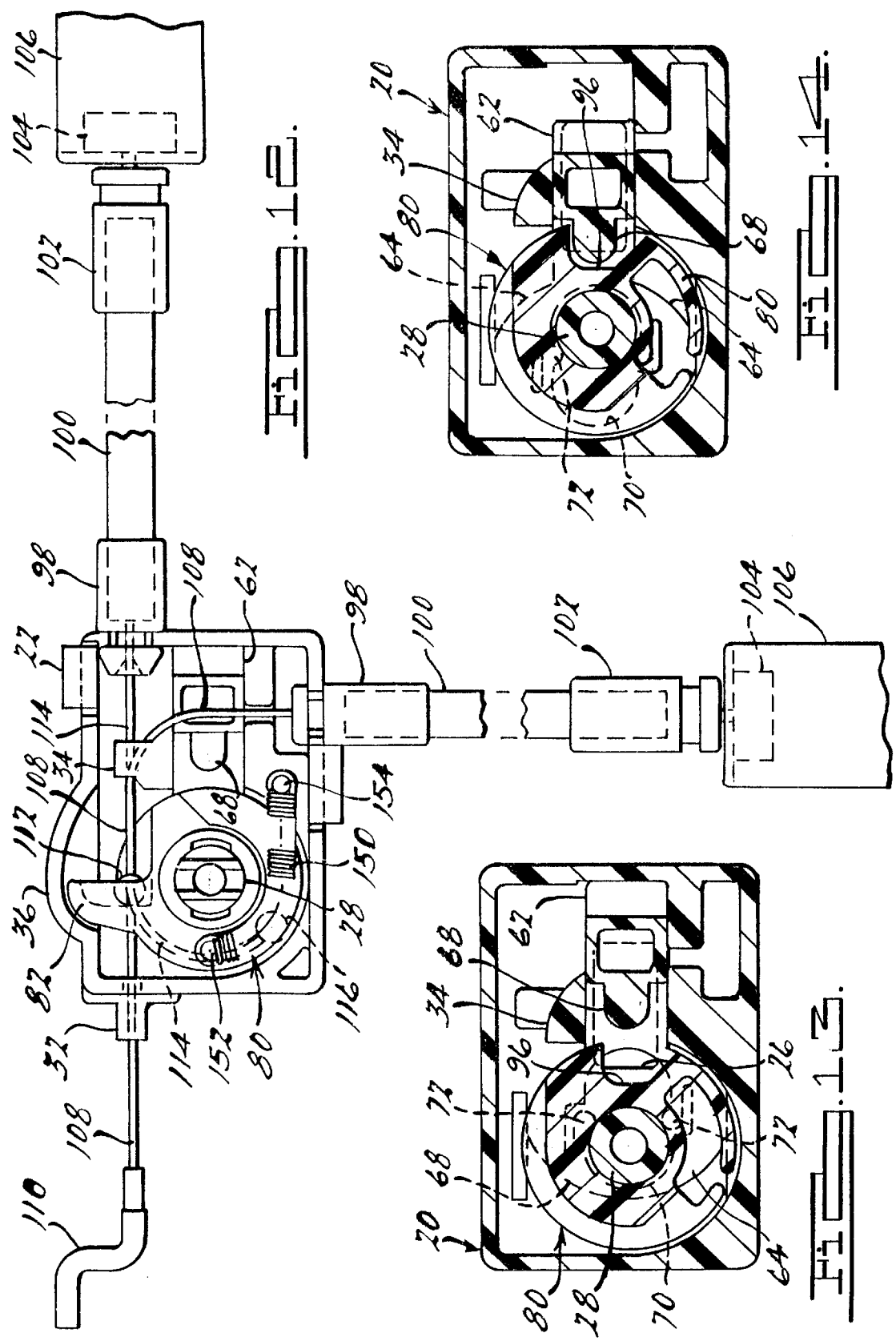

CABLE ASSEMBLY FOR REAR SEAT RELEASE LOCK-OUT SYSTEM

BACKGROUND OF THE INVENTION

1. Field of the Invention

The present invention broadly relates to cable assemblies, and more specifically, to cable assemblies having lock-out mechanisms.

2. Description of Related Art

Cable assemblies have been used and known in the art for many years to actuate release mechanisms for opening doors, lids, and/or covers. For example, in the automotive industry, a release lever is often provided in proximity to a front or rear seat and attached to a cable assembly, used to open a trunk lid, a fuel cap lid, and/or to collapse the back support of a back seat to increase the space from the trunk area.

However, with these types of cable assemblies, access to the passenger compartment often provides access to any compartment actuated by the release mechanism. Even though a person may appropriately be in the passenger compartment, this access to the passenger compartment is not tacit approval to access other compartments in the automobile (e.g., the trunk area). A case in point is the circumstance surrounding valet parking.

A valet is appropriately allowed access to the passenger compartment to park a person's automobile. However, a valet is not permitted access to any other compartment without explicit approval from the owner. And yet, if the automobile is equipped with the previously mentioned cable assemblies, a valet has access to any compartment attached to the cable assembly once access has been gained to the passenger compartment.

This situation is particularly problematic for a passenger compartment equipped with a release to the back support of a back seat which opens to the trunk area of the vehicle. The purpose of this type of release is to increase the trunk space to accommodate items such as skis, surf boards, fishing gear, or other items with dimensions greater then the trunk. Access to the trunk from the passenger compartment allows easy and inconspicuous accessibility to items in the trunk. A valet may be deterred from entering a trunk by the customary method of opening the outside trunk lid due to the conspicuous nature of the act, but access to the trunk through the back support while protected from view inside the passenger compartment may be too tempting for some. Since valuable items are routinely stored in the trunk compartment, for example, CD stereos and laptop computers, etc., access to the trunk from the passenger compartment must be limited.

Additionally, access to the trunk space from the passenger compartment could be especially dangerous for children. Without adult supervision, a child playing in the passenger compartment could release the back support and enter the trunk space to be locked inside the trunk with the potential for dire consequences. If a cable assembly provided a lock-out mechanism to prevent the release of the back support, access to the trunk space by a child could be avoided. Accordingly, there has been a longstanding need in the relevant art to produce a cable assembly that can selectively prevent access to other compartments from the passenger compartment.

Wherefore, it is an object of the present invention to provide a new cable assembly that can selectively prevent actuation of a release mechanism.

A second object of the present invention is to provide a cable assembly with a safety feature that presents a child in the passenger compartment from being able to actuate a release mechanism and gaining access to the trunk space.

Another object of the present invention is to provide a novel dual cable assembly, one control cable capable of selectively preventing actuation of a release mechanism, while the second control cable does not.

Still another object of the present invention is to provide a new dual cable assembly, positioned in an automobile trunk compartment, that selectively prevents actuation of a release mechanism with a control cable positioned in proximity to one of the vehicle seats, and a second control cable positioned in the trunk compartment.

Additional objects, advantages and novel features of the invention will be set forth in part in a description which follows, and in part will become apparent to those skilled in the art upon examination of the following specification, or may be learned by practice of the invention herein. The objects and the advantages of the invention may be realized and attained by means of the instrumentalities and combinations particularly pointed out in the appended claims.

SUMMARY OF THE INVENTION

According to the present invention, the foregoing and other objects and advantages are attained by a cable assembly which comprises: a housing, a pulley member rotatably mounted to the housing, a slide lock member and two control cables. A first control cable slidingly cooperates through the housing and a small opening through the pulley member leaving two ends exiting the housing. A ball slug is affixed to the first control cable inside the housing with the ball slug having dimensions greater than the opening in the pulley member so. A second control cable has a first end secured to the pulley member with a section of the second control cable positioned along the rotating periphery of the pulley member and the second end exiting the housing. Applying a pulling force to the second end of the second control cable rotates the pulley member and engages the ball slug on the first control cable to drive the first control cable in the direction of the pulling action.

However, a slide lock member is capable of moving longitudinally inside the housing between a release and lock position. The slide lock member has an engagement knob that moves into a cavity in the pulley member to prevent rotation of the pulley member when the slide lock member is in the lock position. So once the slide lock member is in the lock position to lock out the pulley member from rotation, pulling on the second end will not drive the first control cable, but the first control cable is always able to slidingly cooperate through the housing and pulley member whether the pulley member is locked out or not. When the slide lock member is forced away from the pulley member in the release position, the pulley member is free to rotate.

Other objects, features and advantages of the present invention will become apparent from the subsequent description and appended claims taken in conjunction with the accompanying drawings.

BRIEF DESCRIPTION OF THE DRAWINGS

FIG. 1 shows an exploded perspective view of a cable assembly according to the present invention oriented with a conventional latch release to exemplify the use of the present invention.

FIG. 2 shows a bottom plan view of the housing for the cable assembly according to the present invention.

FIG. 3 shows an offset longitudinal sectional view of the housing taken along line 3—3 of FIG. 2.

FIG. 4 shows an offset cross-sectional view of the housing taken along line 4—4 of FIG. 2.

FIG. 5 shows a side elevation view of the pulley member for the cable assembly according to the present invention.

FIG. 6 shows a sectional view of the pulley member taken along line 6—6 of FIG. 5.

FIG. 7 shows a sectional view of the pulley member taken along line 7—7 of FIG. 5.

FIG. 8 shows a front elevation view of the pulley member in FIG. 5.

FIG. 9 shows a bottom plan view of the slide lock member for the cable assembly according to the present invention.

FIG. 10 shows a longitudinal sectional view of the slide lock member taken along line 10—10 of FIG. 9.

FIG. 11 shows a front elevation view of the slide lock member in FIG. 9.

FIG. 12 shows the lock-out cable assembly assembled according to the present invention and having release straps.

FIG. 13 shows a sectional view of the housing taken along line 13—13 of FIG. 3, and includes sectionals of the slide lock member and pulley member to emphasize the position of the slide lock member in a release position.

FIG. 14 shows a sectional view similar to FIG. 13 to emphasize the cooperation between the pulley member and slide lock member in a lock position.

BEST MODE OF CARRYING OUT THE INVENTION AND DESCRIPTION OF THE PREFERRED EMBODIMENT

The lock-out cable assembly generally comprises a rectangular housing, a slide lock member, a pulley member, and at least one control cable with the embodiments shown having two control cables. Throughout this specification, like element number are used to describe the same parts throughout the various drawing figures referred to.

Referring to the drawings, the new lock-out cable assembly is shown in FIG. 1 in relation to a conventional release latch 18 (the entire structure adjacent the housing 20). However, it should be noted that the release latch 18 is not a part of the new lock-out cable assembly and is only presented to add orientation perspective and increase understanding for the use of the present invention (which will be described subsequently).

Accordingly, any design of a release mechanism could be used with the new invention, particularly designs that control cable actuate. Additionally, it should be noted that the proximity of the conventional release mechanism does not have to be adjacent to the lock-out cable assembly as shown, but the separation between the two may be any distance depending on the particular requirements of the working environment with only an increase in the length of a control cable to accommodate the separation.

FIGS. 2–4 illustrate a housing 20 for the new lock-out cable assembly comprising generally a rectangular box with the bottom missing. The housing 20 is constructed from any durable plastic, as is the pulley member 80 and slide lock member 60, but it should be noted that any material could be used depending on the particular requirements of the working environment. This design of the housing 20 has two snap arms 22 extending from opposing sides of the housing 20 to secure the lock-out cable assembly in the trunk compartment of a motor vehicle. The top 24 of the housing 20 has a rectangular opening 26 with a cylindrical column 28 extending perpendicularly from the inside face of the top 24. Two adjacent walls at right angles include end slots 30 and a third wall has an opening 38 to a route groove 32. A routing guide 34 extends perpendicularly from the inside face of the top 24. The fourth wall includes a curved portion 36 designed to accommodate a pulley member 80.

A slide lock member 60 is illustrated in FIGS. 9-11 having a thin flat section, the flat section having a rectangular portion 62 integral with an elliptical portion 64. The rectangular portion 62 has a finger knob 66 extending perpendicularly from one side and an engagement knob 68 extending perpendicularly from the opposite side and centered on the longitudinal axis of the rectangular portion 62.

The elliptical portion 64 has an oblong opening 70 also centered on the longitudinal axis. The periphery of the oblong opening 70 includes two nodules or bi-directional lobe members (hereinafter "nodules") 72 on opposite sides of the longitudinal axis and oriented in opposite directions. The slide lock member 60 is positioned inside the housing 20 adjacent the inside face of the top 24 with the finger knob 66 positioned through the rectangular opening 26 of the top 24. The oblong opening 70 of the slide lock member 60 receives the cylindrical column 28 of the housing 20 with the longitudinal axis of the slide lock member 60 perpendicular to the axis of rotation of the pulley member 80 established by the cylindrical column 28. The length of the oblong opening 70 allows the slide lock member 60 to slide longitudinally (perpendicular to the cylindrical column 28) inside the housing 20 between a release and lock position. The nodules 72 abut against the cylindrical column 28 in each release and lock position to secure the slide lock member 60 in each position (both positions will be defined subsequently after a description of the pulley member 80).

The pulley member 80 is illustrated by FIGS. 5–8. FIG. 8 demonstrates the pulley member 80 is generally circular with a fin portion 82 extending radially from the periphery. The fin portion 82 has a slit 84 through the center of the fin portion 82 and a widened portion 86 around the slit 84. FIGS. 6–7 demonstrate the different circular and peripheral grooves and openings, particularly a central opening 88 to receive the cylindrical column 28 of the housing 20 for rotation in the housing 20 about an axis established by the cylindrical column 28. The cylindrical column 28 has lateral ridges 29 to secure of the pulley member 80 and slide lock member inside the housing 20. The pulley member 80 further includes a circumferential groove 90 to receive a control cable (identified subsequently). A first small rounded protuberance 152 extending from the pulley member 80 receives one end of a tension coil spring 150 (shown in FIGS. I and 12) and the second end of the tension coil spring 150 is positioned on a second rounded protuberance 154 in the housing 20. The pulley member 80 further includes a receiving cavity 96 generally centered on the longitudinal axis of said slide lock member 60.

The release position of the slide lock member 60 is established by the engagement knob 68 resting opposite the receiving cavity 96 of the pulley member 80 at a predetermined distance. The lock position is defined by the engagement knob 68 positioned inside the receiving cavity 96 to prevent rotation of the pulley member 80. The two positions are established by applying a force to the finger knob 66 in the general direction of the longitudinal axis of the slide lock member 60 to move the slide lock member 60 from the one position to the next.

The end slots 30 of said housing 20 are fixedly provided with cylindrical end fixtures 98 which receive outer casings 100, and each outer casing 100 receives a control cable slidingly cooperating inside each outer casing 100. The embodiments of each control cable shown further include second cylindrical end fixtures 102 with the second end of the outer casing 100 secured inside and the control cables terminating in cylindrical slugs 104 with the cylindrical slugs 104 positioned inside lever straps 106 to secure the lever straps 106 to the control cables. Accordingly, a pulling force applied to the lever straps 106 slidingly moves the corresponding control cable inside the outer casing 100 in the direction of the pulling force. However, it should be noted that any lever mechanism, instead of lever straps, may be used to provide the pulling force to the control cables.

A first control cable 108 has a first end secured to a lever strap 106 and extends into the cylindrical end fixture 98 affixed in the housing 20 through the routing guide 34. The routing guide 34 angles the first control cable 108 generally 90° into the slit 84 of the fin portion 82 of the pulley member 80 and exits the housing 20 through route groove 32. The second end of the first control cable 108 has a S-shaped terminal wire 110 designed to be secured to the conventional latch release mechanism, as previously mentioned and shown in FIG. 1. A ball slug 112 is affixed to the first control cable 108 between the fin portion 82 and the routing guide 34 and routinely rests inside the widened portion 86 of the slit 84 until the lever strap 106 of the first control cable 108 is pulled.

A second control cable 114 also has a first end secured to a lever strap and then extends into the cylindrical end fixture 98 affixed to the housing 20 at a wall adjacent and perpendicular to the cylindrical end fixture 98 containing the first control cable 108. The second control cable 114 continues inside the housing positioned adjacent and generally parallel to the portion of the first control cable 108 between the routing guide 34 and the fin portion 82. The second control cable rests inside the circumferential groove 90 of the pulley member 80 and wrap around the pulley member 80 approximately 180°. The second end of the second control cable 114 is affixed to a second ball slug 116 secured inside the pulley member 80. Applying the pulling force to the lever strap 106 of second control cable 114 rotates the pulley member 80 so the fin portion 82 can drive the ball slug 112 thereby driving the first control cable 108 to actuate a release latch.

In operation, the housing 20 is ideally positioned inside the trunk compartment and secured to the back support for a rear seat. The lever strap 106 for the first control cable 108 is positioned inside the trunk compartment and the other end is secured to a release latch for the back support. The pulley member 80 is locked out (prevented from rotating) by applying a force to the finger knob with a finger in the longitudinal direction from the release position to move the slide lock member into the lock position. However, whether or not the pulley member 80 is locked out does not affect the first control cable 108 since it slidingly cooperates through the pulley member 80. Therefore, the lever strap 106 in the trunk can always be pulled to actuate the release latch mechanism.

The lever strap 106 for the second control cable 114 is positioned inside the passenger compartment ideally proximate to the driver's seat. If the slide lock member 60 is in the release position, pulling the lever strap 106 drives the first control cable 108, as previously described, to actuate the release latch mechanism. The tension coil spring 150 biases the pulley member 80 in the opposite direction to return the pulley member 80 to its original position once the pulling force is discontinued. However, if the pulley member 80 is locked out, applying a pulling force to the second control cable 114 will not rotate the pulley member 80, and therefore, the first control cable will not be driven to actuate the release latch mechanism.

Is should be noted that a lock-out cable assembly for a latch release to a trunk lid would require only one control cable, the control cable located in the passenger compartment. There would be no need for another control cable inside the trunk compartment. Additionally, the control cable would enter the housing 10 from the passenger compartment and wrap around a section of the pulley member 80 to rotate the pulley member 80 with the control cable affixed to the pulley member 80 as previously described. However, where the control cable of the previous description terminates at the ball slug 116 secured in the pulley member 80, this embodiment would include the control cable continuing from the ball slug 116 to exit the housing 20 to provide two ends of the control cable exiting the housing 20. The second end would be secured to the release latch cooperating with the trunk lid. Accordingly, if the pulley member 80 is not locked out, pulling the lever strap inside the passenger compartment will release the trunk lid.

What is claimed is:

1. A lock-out cable assembly comprising:

a housing having a cylindrical column;

a pulley member rotatably mounted to said cylindrical column, said pulley member having an opening extending through a portion of a rotating edge;

a first control cable slidingly cooperating through the housing and through the opening of said pulley member, a ball slug is affixed to a segment of the first control cable positioned inside the housing, said ball slug having dimensions greater than the opening, said first control cable capable of movement in two directions, one directional movement impeded when the ball slug abuts against the pulley member at the opening;

a second control cable having a first end secured to the pulley member with a section of said second control cable positioned along a section of the rotating edge of said pulley member and the second end slidingly cooperating through said housing such that applying a pulling force to the second end of said second control cable rotates said pulley member, said rotation enables the pulley member at the opening to engage said ball slug and drive the first control cable; and a slide lock member slidingly cooperating between a release and lock position within said housing to engage said pulley member and prevent rotation of said pulley member, said slide lock member includes an oblong opening to receive the cylindrical column of said housing, the oblong opening allows the slide lock member to slide on a longitudinal axis between the release and lock positions, the longitudinal axis is perpendicular to the rotation axis of said pulley member.

2. The lock-out cable assembly of claim 1 further including a biasing means for biasing said pulley member in a rotational direction opposite the rotational direction produced by applying a pulling force to the second end of the second control cable.

3. The lock-out cable assembly of claim 1 wherein said pulley member further includes a cavity in said pulley member.

4. The lock-out cable assembly of claim 3 wherein said slide lock member further includes an engagement knob, said release position is established with the engagement knob resting a distance from said pulley member, said lock position is established by sliding the engagement knob toward the pulley member until the engagement knob is positioned inside said cavity to prevent rotation of said pulley member.

5. The lock-out cable assembly of claim 4 wherein said slide lock member further includes a finger knob protruding from said housing to allow manipulation of the slide lock member between the release and lock positions.

6. The lock-out cable assembly of claim 1 wherein said cable assembly is used to lock out access to a vehicle trunk compartment through a fold-down seat panel.

7. The lock-out cable assembly of claim 1 wherein said slide lock member further includes two bi-directional lobe members on the periphery of the oblong opening on opposite sides of the longitudinal axis, nodules abut against the cylindrical column in each release and lock position of the slide lock member to secure the slide lock member in each position.

8. The lock-out cable assembly of claim 7 wherein said pulley member further includes a fin portion extending radially from the periphery, said fin portion having a slit to receive said first control cable generally perpendicular to the fin portion, the fin portion includes a portion of the slit widened to receive said ball slug.

9. A lock-out cable assembly comprising:
    a housing having a cylindrical column;
    a pulley member rotatably mounted to said cylindrical column;
    a control cable slidingly cooperating through the housing, a portion of the control cable is positioned along a section of a rotating edge of said pulley member and affixed to the periphery to produce rotation of said pulley member upon applying a pulling force to an end of said control cable, each end of the control cable is positioned outside said housing;
    a second control cable having a first end secured to the pulley member and a second end cooperating with said housing such that applying a force to said second end of said second control cable rotates said pulley member; and
    a slide lock member slidingly cooperating between a release and lock position within said housing to engage said pulley member and prevent rotation of said pulley member, said slide lock member having an oblong opening to receive the cylindrical column of said housing, the oblong opening allows the slide lock member to slide on a longitudinal axis between the release and lock positions, the longitudinal axis is perpendicular to the rotation axis of said pulley member.

10. The lock-out cable assembly of claim 9 further including a biasing means for biasing said pulley member in a rotational direction produced by applying a pulling force to an end of the control cable.

11. The lock-out cable assembly of claim 3 wherein said pulley member further includes a cavity in said pulley member.

12. The lock-out cable assembly of claim 11 wherein said slide lock member further includes an engagement knob, said release position is established with the engagement knob resting a distance from said pulley member, said lock position is established by sliding the engagement knob toward the pulley member until the engagement knob is positioned inside said cavity to prevent rotation of said pulley member.

13. The lock-out cable assembly of claim 12 wherein said slide lock member further includes a finger knob protruding from said housing to allow manipulation of the slide lock member between the release and lock positions.

14. The lock-out cable assembly of claim 9 wherein said slide lock member further includes two nodules on the periphery of the oblong opening on opposite sides of the longitudinal axis, the nodules abut against the cylindrical column in each release and lock position of the slide lock member to secure the slide lock member in each position.

15. A dual cable assembly comprising:
    a housing having a cylindrical column;
    a pulley member rotatably mounted to said housing, said pulley member having an opening extending therethrough,
    a first control cable slidingly cooperating through the housing and through the opening of said pulley member, a slug is affixed to a segment of the first control cable positioned inside the housing, said slug having dimensions greater than the opening, said first control cable capable of movement in two directions, one directional movement impeded when the slug abuts against the pulley member at the opening;
    a second control cable having a first end secured to the pulley member with a section of said second control cable positioned along a section of a rotating edge of said pulley member, and the second end slidingly cooperating though said housing such that applying a pulling force to the second end of said second control cable rotates said pulley member, said rotation enables the pulley member at the opening to engage said slug and drive the first control cable; and
    a slide lock member slidingly cooperating between a release and a lock position within said housing to engage said pulley member and prevent rotation of said pulley member, said slide lock member having an oblong opening to receive the cylindrical column of said housing.

16. The cable assembly of claim 15 further including a biasing means for biasing said pulley member in a rotational direction opposite the rotational direction produced by applying a pulling force to the second end of the second control cable.

* * * * *